May 11, 1965     E. R. ZIMMERMAN     3,182,419

BAIT BOXES

Filed Jan. 13, 1964

INVENTOR.
ERNEST R. ZIMMERMAN
BY
Gerald P. Welch
ATTORNEY

3,182,419
BAIT BOXES
Ernest R. Zimmerman, 911 Mound St., Baraboo, Wis.
Filed Jan. 13, 1964, Ser. No. 337,502
1 Claim. (Cl. 43—55)

This invention relates to improvements in bait boxes, and more particularly to a novel bait box of a type adapted for use with angle worms or minnows.

An object of the invention is to provide a device of the type of simple and compact construction which may easily be converted from use for minnows, to equally convenient use for angle worms as bait.

Other and further objects of the invention will appear as the description proceeds, reference being had to the accompanying drawing, in which.

Figure 1:
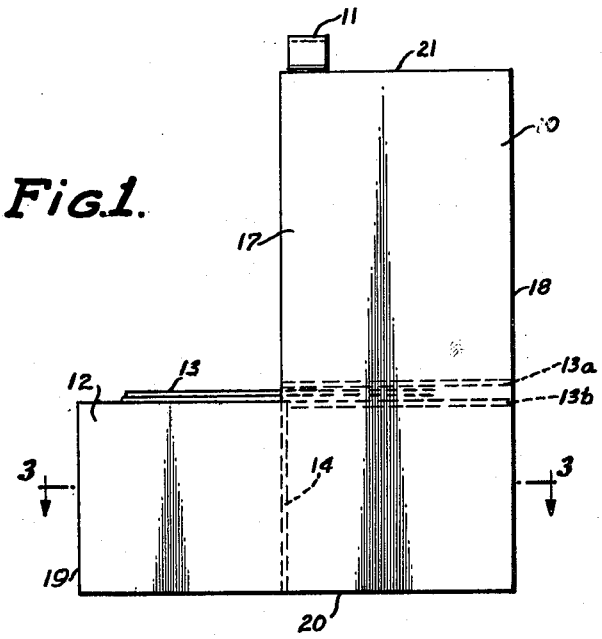
FIG. 1 is a side view in elevation of a bait box embodying the invention.
Figure 2:
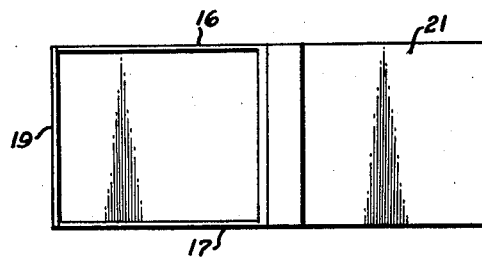
FIG. 2 is a plan view of the same.

Referring more particularly to the drawing, the numeral 10 represents the bait box having a handle 11 at the top and forwardly projecting lower portion 12 provided with a sliding cover 13, held in the guides 13A and 13B. A removable vertical partition 14 is provided. The partition 14 is curved and has a number of perforations 15. The bait box 10 is formed of two L-shaped vertical walls 16 and 17, the rear wall 18, the relatively short frontal wall 19, the bottom 20 and the relatively short top 21.

In use, the bait box may be used without the partition 14 as a suitable receptacle for angle worms by the fisherman. Ordinarily, the angle worms are placed in the box with a quantity of earth. The angle worms will make their way to the bottom of the box 10 underneath the soil. When it is desired to utilize an angle worm while fishing, the box is tipped on its back wall 18. The soil will fall away toward the wall 18 to expose the angle worms. After the box has been left in this position for a time, the worms will again make their way down through the soil to reach proximity with the wall 18. When the worms again become necessary for baiting a hook or the like, the box is moved to an upright position to rest on its bottom 20. This will again bring the angle worms to the top of the soil.

Figure 3:
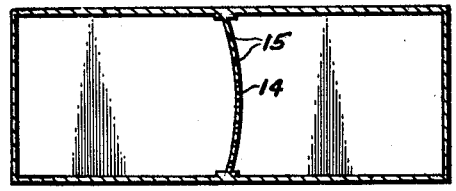
FIG. 3 is a cross-sectional view taken on line 3—3 of FIG. 1.

When the box is utilized as a receptacle for minnows, the partition 14 is placed vertically between the unnumbered guides shown in FIG. 3. A quantity of water is placed in the box and the minnows are inserted frontally of the partition 14. The cover 13 may be kept closed until use for the minnows is occasioned. The bait box 10 may then be tipped over to rest on the wall 18, with the result that the water will run through the perforations 15 in the partition 14 and the minnows will rest on the partition which then will be in horizontal position. This will provide easy access to the minnows for the purpose of baiting.

It will be understood that the device is capable of many modifications in structure and design, without departing from the spirit of the invention, within the scope of the appended claim.

Having thus described the invention, what is claimed and desired to be secured by Letters Patent of the United States, is:

A bait box comprising a rectangular upright body open on one side from the top downwardly for a portion of its length, a projecting portion on the lower end of the same side, a sliding cover for said projecting portion slidable into said upright body, and a plurally perforated removable vertical partition between said projecting portion and the lower part of the body portion.

References Cited by the Examiner
UNITED STATES PATENTS
3,044,209    7/62    Roach _____ 43—56

ABRAHAM G. STONE, *Primary Examiner.*